(12) United States Patent
Nakamura (10) Patent No.: US 7,657,991 B2
(45) Date of Patent: Feb. 9, 2010

(54) MAGNETIZATION APPARATUS AND MAGNETIZATION METHOD

(75) Inventor: Tomomi Nakamura, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 355 days.

(21) Appl. No.: 11/797,383

(22) Filed: May 3, 2007

(65) Prior Publication Data
US 2007/0261764 A1 Nov. 15, 2007

(30) Foreign Application Priority Data
May 11, 2006 (JP) ............... 2006-132799

(51) Int. Cl.
*H02K 15/02* (2006.01)
(52) U.S. Cl. .............. 29/596; 29/598; 29/607; 29/732; 29/826
(58) Field of Classification Search ............ 29/596, 29/598, 826, 607, 732, 737
See application file for complete search history.

(56) References Cited

U.S. PATENT DOCUMENTS

| 6,441,711 B2 * | 8/2002 | Young ............... 335/299 |
| 6,906,438 B2 * | 6/2005 | Ursel et al. ........... 310/89 |
| 2004/0135446 A1 * | 7/2004 | Yamamoto et al. ....... 310/89 |
| 2009/0051227 A1 * | 2/2009 | Kim et al. ............. 310/12 |

FOREIGN PATENT DOCUMENTS

| JP | 02155450 A | * | 6/1990 |
| JP | A-2003-61303 | | 2/2003 |
| JP | A-2004-503192 | | 1/2004 |

* cited by examiner

*Primary Examiner*—Derris H Banks
*Assistant Examiner*—Azm Parvez
(74) *Attorney, Agent, or Firm*—Posz Law Group, PLC (57) ABSTRACT

A magnetization apparatus for magnetizing a magnetic material provided inside a yoke housing of a motor, which has a connector portion radially outward of the yoke housing, includes at least one pair of magnetization cores and a plurality of magnetization coils. The at least one pair of magnetization cores are provided to oppose to each other, wherein the at least one pair of magnetization cores have corresponding magnetization surfaces, which oppose to each other. The plurality of magnetization coils generate a magnetic field at the at least one pair of magnetization cores, wherein the plurality of magnetization coils magnetize the magnetic material in a state, where the yoke housing is provided between the magnetization surfaces. The at least one pair of magnetization cores defines a receiving recess therein for receiving the connector portion of the motor in the state, where the yoke housing is provided between the magnetization surfaces.

7 Claims, 6 Drawing Sheets

MAGNETIZATION APPARATUS AND MAGNETIZATION METHOD

CROSS REFERENCE TO RELATED APPLICATION

This application is based on and incorporates herein by reference Japanese Patent Application No. 2006-132799 filed on May 11, 2006.

BACKGROUND OF THE INVENTION

1. Field of the Invention

The present invention relates to a magnetization apparatus and a magnetization method, and typically relates to a magnetization apparatus and a magnetization method for externally magnetizing a non-magnetized magnetic material, which is provided to an inner periphery of a yoke housing, from an outer peripheral portion of the yoke housing.

2. Description of Related Art

Conventionally, a motor, such as a wiper motor, a window motor, a sunroof motor, and a seat motor, includes a tubular yoke housing with a bottom, a brush holder unit, and a gear housing. The yoke housing rotatably receives an armature such that the armature is rotatable, and the brush holder unit is assembled with a side of the yoke housing toward an opening of the yoke housing (assembled with an opening side of the yoke housing). The gear housing is assembled to the yoke housing through the brush holder unit (see, for example, JP-A-2003-61303, JP-A-2004-503192).

A motor disclosed in JP-A-2003-61303 has a permanent magnet, the armature, and a commutator. The permanent magnet disposed at an inner peripheral surface of the yoke housing. The armature is rotatably received in the yoke housing to oppose the permanent magnet. The commutator is provided on a rotation shaft of the armature toward the opening side of the yoke housing. The brush holder unit includes a brush holder body portion and a connector portion. The connector portion projects outwardly from the brush holder body portion in a radial direction of the rotation shaft. The brush holder body portion supports a brush, which slides on the commutator, in a state, where the brush is biased toward the commutator.

The connector portion is connected with an external connector for power supply to the motor and for sending and receiving signals. The connector portion outwardly extends from the brush holder body portion in the radial direction of the rotation shaft, and the connector portion further projects toward the yoke housing along the axis of the rotation shaft to be positioned on a side of the yoke housing (positioned radially outward of the yoke housing).

When the above motor is manufactured, a premagnetized permanent magnet may be placed inside the yoke housing, and then an armature may be inserted into the yoke housing. In this manufacturing method, a magnetic force of the permanent magnet may attract the armature, and therefore this brings disadvantage, where the armature cannot be assembled smoothly.

In order to handle this disadvantage, firstly a magnetic material (non-magnetized permanent magnet) and the armature are placed inside the yoke housing, and then the magnetic material is magnetized from an outer peripheral portion of the yoke housing by using a magnetization apparatus.

However, a motor disclosed in JP-A-2003-61303 has a connector portion provided radially outward of the yoke housing and the permanent magnet. Therefore, when the magnetic material needs to be magnetized from an outer peripheral portion of the yoke housing after assembling a magnetic material, an armature, and a brush holder unit with the yoke housing, the yoke housing may not be placed between opposing magnetization cores of the magnetization apparatus because the connector portion obstacles. Because of this, after the magnetized permanent magnet is placed to the yoke housing, the armature needs to be inserted into the yoke housing, resulting in that the motor disclosed in JP-A-2003-61303 disadvantageously requires more time (labor) for in the assembly.

Also, in the motor disclosed in JP-A-2003-61303, when the magnetic material is magnetized from an outer periphery of the yoke housing using the magnetization apparatus after the magnetic material, the armature, and the brush holder unit have been assembled, a projection direction of the connector portion may require to be changed, for example, in an opposite direction (a direction opposite the yoke housing). Therefore, a flexibility of designing is limited.

In contrast, in a motor disclosed in JP-A-2004-503192, an intermediate connector portion extends radially outwardly from the brush holder unit, and a separated electronic device casing, which houses a printed board, is assembled to the intermediate connector portion. The electronic device casing has a connector, which is connected with an external connector.

Due to the above structure, in the motor disclosed in JP-A-2004-503192, even after the brush holder unit has been assembled, the magnetic material can be magnetized by placing the yoke housing to the magnetization apparatus only if the electronic device casing has not been attached.

However, in the motor disclosed in JP-A-2004-503192, after the magnetization process, the separated electronic device casing requires to be assembled. Thus, a component count becomes disadvantageously larger. Also at the same time, because the intermediate connector portion and the electronic device casing are electrically connected while the electronic device casing is supported in the above structure, the supporting performance of this connection becomes smaller. Therefore, another structure for supporting the electronic device casing is required other than the connection. As a result, the motor disadvantageously becomes larger in size.

SUMMARY OF THE INVENTION

The present invention is made in view of the above disadvantages. Thus, it is an objective of the present invention to address at least one of the above disadvantages.

To achieve the objective of the present invention, there is provided a magnetization apparatus for magnetizing a magnetic material provided inside a yoke housing of a motor to oppose to an armature, the motor having a connector portion radially outward of the yoke housing, the apparatus including at least one pair of magnetization cores and a plurality of magnetization coils. The at least one pair of magnetization cores are provided to oppose to each other, wherein the at least one pair of magnetization cores have corresponding magnetization surfaces, which oppose to each other. The plurality of magnetization coils generate a magnetic field at the at least one pair of magnetization cores, wherein the plurality of magnetization coils magnetize the magnetic material in a state, where the yoke housing is provided between the magnetization surfaces. The at least one pair of magnetization cores defines a receiving recess therein for receiving the connector portion of the motor in the state, where the yoke housing is provided between the magnetization surfaces.

To achieve the objective of the present invention, there is also provided a magnetization method for magnetizing a magnetic material provided inside a yoke housing of a motor that has a connector portion provided radially outward of the yoke housing. In this method, the magnetic material is provided to be fixed inside the yoke housing. An armature is rotatably provided inside the yoke housing to oppose the magnetic material. A brush holder unit, which has the connector portion, is assembled with an opening side of the yoke housing. The motor is placed by providing the yoke housing between at least one pair of magnetization cores, which oppose with each other, and by inserting the connector portion into a receiving recess, which is recessed in the at least one pair of magnetization cores. A magnetic field is generated at the at least one pair of magnetization cores to magnetize the magnetic material inside the yoke housing.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

One embodiment of the present invention will be described referring to the accompanying drawings. Here, the devices (members) and arrangement described below do not limit the present invention, and various modifications can be made based on the scope and spirit of the present invention.

Figure 1:
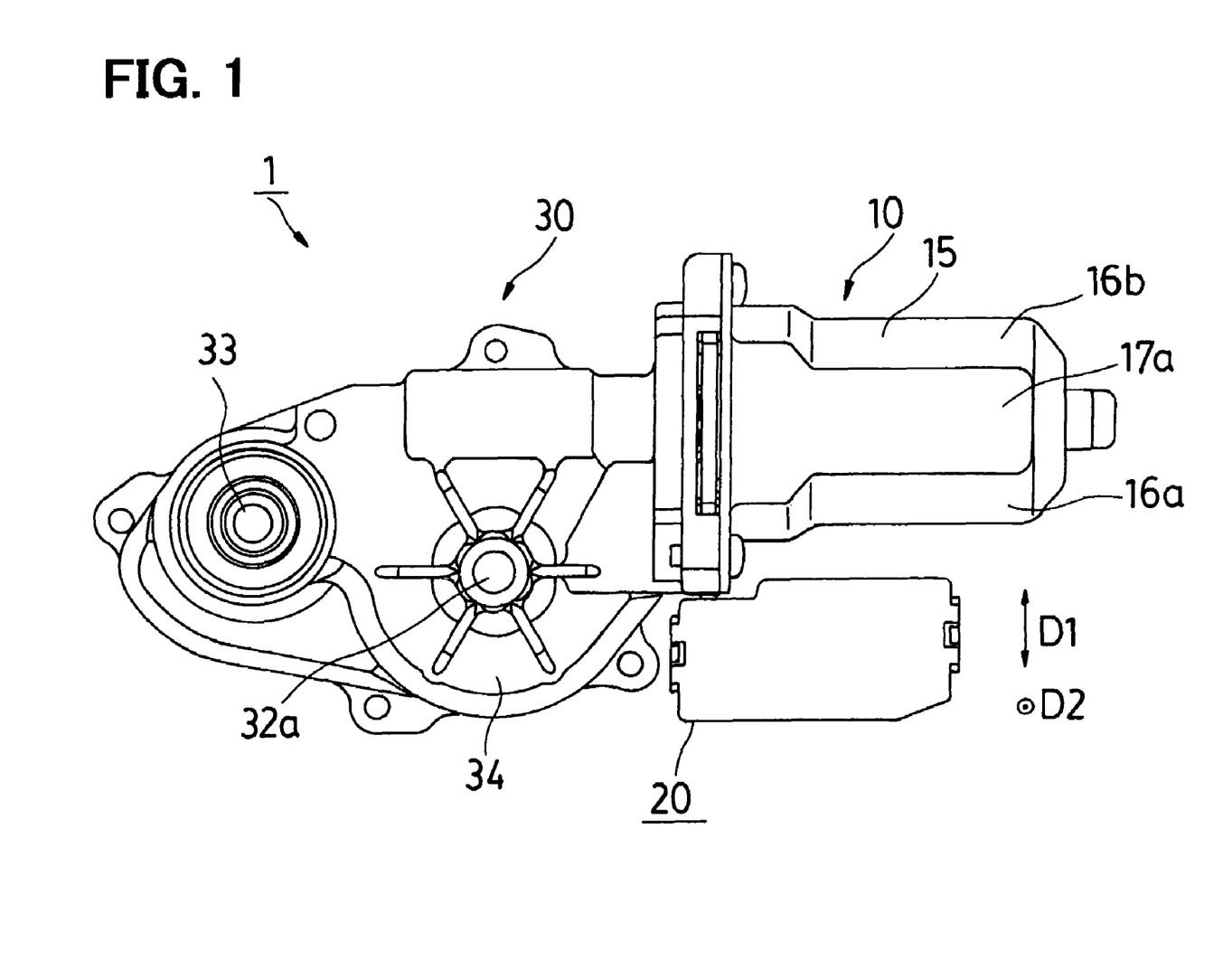
FIG. 1 is a front view of a motor according to one embodiment of the present invention.
Figure 2:
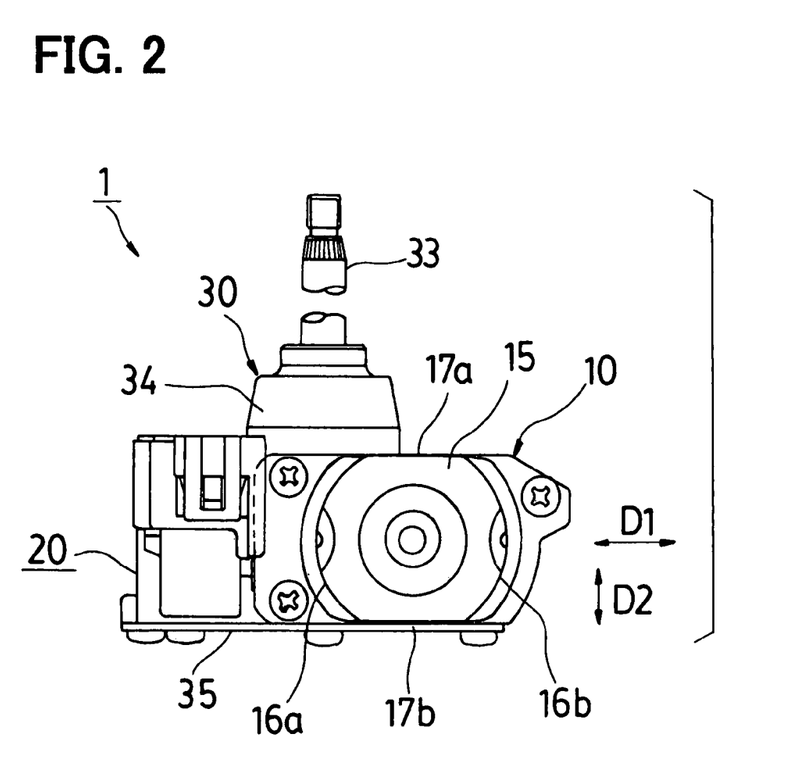
FIG. 2 is a side view of the motor according to the one embodiment of the present invention.
Figure 3:
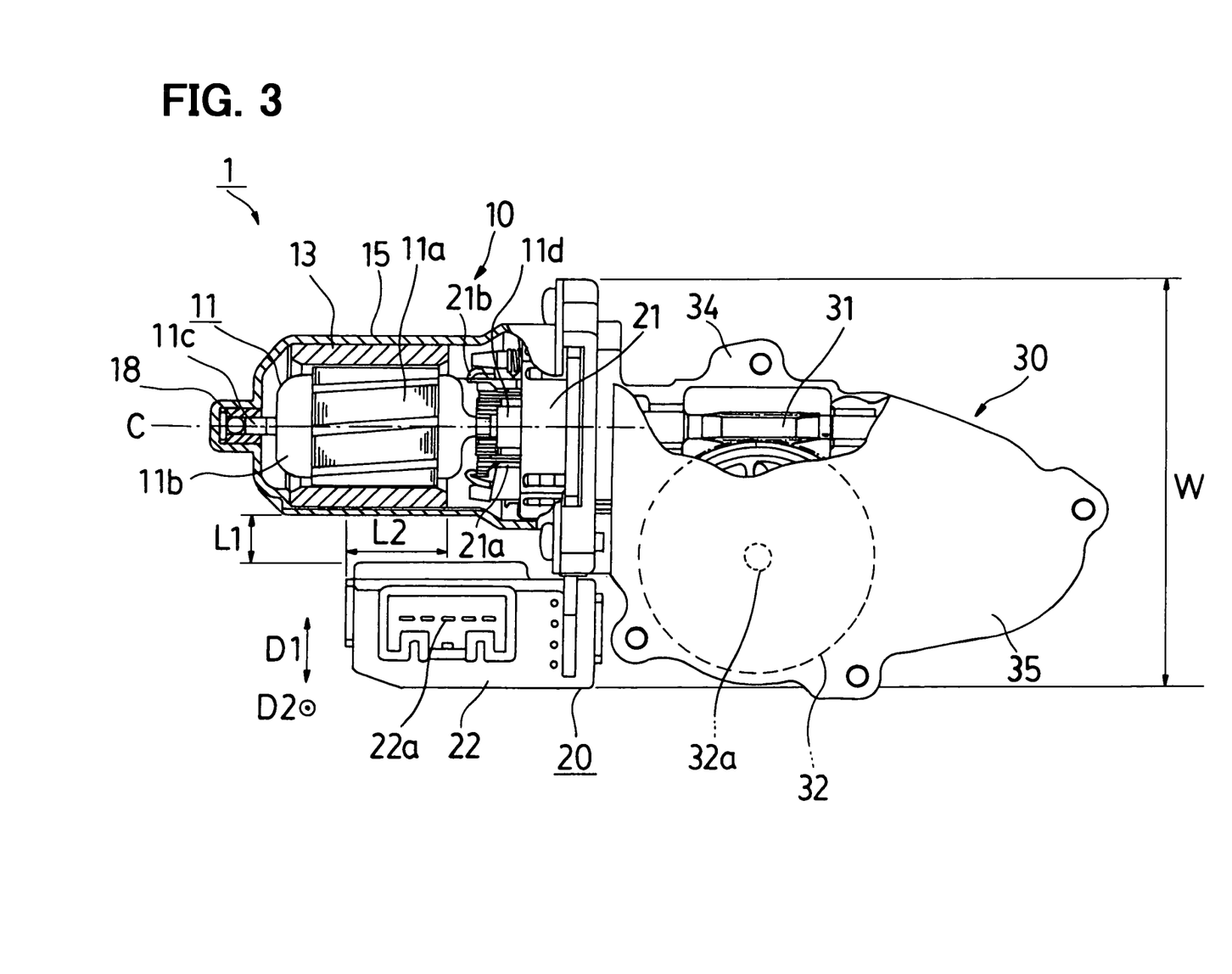
FIG. 3 is a cutaway rear view of the motor according to the one embodiment of the present invention.

One embodiment of the present invention, which is embodied as a wiper motor for a vehicle, will be described. As shown in FIGS. 1 to 3, a motor 1 of the present embodiment includes a motor body portion 10 and a transmission mechanism 30.

The motor body portion 10 of the present embodiment mainly includes an armature 11, multiple permanent magnets 13, a tubular yoke housing 15 with a bottom, and a brush holder unit 20. Typically, the multiple permanent magnets 13 are provided to oppose to the armature 11, and the brush holder unit 20 is assembled with an opening side of the yoke housing 15 (i.e., the brush holder unit 20 is assembled with the yoke housing 15 on a side toward the opening of the yoke housing 15).

The armature 11 includes an iron core 11a, a winding 11b, a shaft 11c, and a commutator 11d. The iron core 11a has thin plate-shaped core sheets, which are laminated on top of each other. The winding 11b is wound around the iron core 11a. The shaft 11c is inserted into the iron core 11a to be fixed therein, and the commutator 11d is attached to the shaft 11c.

The yoke housing 15 is shaped to have a cross section of a flat shape (see FIG. 2). Specifically, the yoke housing 15 includes a pair of arcuate portions 16a, 16b and a pair of flat portions 17a, 17b. The arcuate portions 16a, 16b are arcuate-shaped peripheral surfaces, and the flat portions 17a, 17b are flat peripheral surfaces, which connect the arcuate portions 16a, 16b in a circumferential direction and are arranged approximately parallel with each other. The yoke housing 15 is shaped to have the cross section of the flat shape taken along a plane perpendicular to a direction of a longitudinal axis C of the armature 11 (i.e., a longitudinal direction of the armature 11). Here, the flat shape has a longitudinal axis, along which the arcuate portions 16a, 16b are arranged to face with each other, and a transverse axis, along which the flat portions 17a, 17b are arranged to face with each other. As above, the yoke housing 15 of the present embodiment has the cross section of the flat shape instead of an approximate circular shape such that the yoke housing 15 can be shaped thinner.

Here, in the present embodiment, the yoke housing 15 is formed to have the cross sectional shape of the flat shape. However, the cross sectional shape is not limited to this, but can be an approximate circular shape.

The bottom of the yoke housing 15 is formed by swelling, and a bearing 18 is provided inside the swelled portion. The transmission mechanism 30 is provided with a bearing (not shown). The shaft 11c of the armature 11 has both end portions rotatably supported by the above bearings 18, and the like.

The permanent magnets 13 are provided and fixed to inner peripheral surfaces of the arcuate portions 16a, 16b of the yoke housing 15, and oppose to the iron core 11a of the armature 11 in a radial direction with a slight clearance between the permanent magnet 13 and the iron core 11a. Specifically, each permanent magnet 13 corresponds a plate magnetic material 13a (see FIG. 6) that has been magnetized such that a magnetic flux is applied in the radial direction, and has an arcuate shape, which corresponds to a curved shape of the inner peripheral surface of the arcuate portions 16a, 16b of the yoke housing 15.

The brush holder unit 20 is formed by resin molding a brush holder body portion 21 integrally with a connector portion 22 in a state, where an electrically conductive member (not shown) is embedded therein.

The brush holder body portion 21 is shaped to correspond to an inner peripheral shape of an opening portion of the yoke housing 15, and the brush holder body portion 21 is provided to close the opening portion of the yoke housing 15 in a state, where the shaft 11c extends through the brush holder body portion 21 toward the transmission mechanism 30. Also, the brush holder body portion 21 supports a pair of brushes 21a, which are slidable on the commutator 11d, in a state, where the brushes are biased against the commutator 11d. Each of the pair of brushes 21a has an end connected with a pig-tail wire 21b, and another end connected with an electrically conductive member (not shown) directly or indirectly.

The connector portion 22 radially outwardly extends from the brush holder body portion 21, and also projects along the yoke housing 15 in the direction of the longitudinal axis C of the armature 11. Also, the connector portion 22 includes multiple terminals 22a connected with the electrically conductive member.

As shown in FIG. 3, the connector portion 22 of the present embodiment projects from the brush holder body portion 21 in a direction D1 of the longitudinal axis of a cross sectional shape of the yoke housing 15 (in a longitudinal direction D1, in which the arcuate portions 16a, 16b are arranged to face with each other). Also, the connector portion 22 is spaced away from the yoke housing 15 (arcuate portion 16a) in the radial direction by a clearance L1. Also, the connector portion 22 projects to radially face with the permanent magnet 13 inside the yoke housing 15 by a length L2 in the direction of the longitudinal axis C. As discussed above, in the motor 1 of the present embodiment, the connector portion 22 is arranged radially outward of the yoke housing 15 and the permanent magnet 13 to overlap with the yoke housing 15 and the permanent magnet 13 in the direction of the longitudinal axis C.

The transmission mechanism 30 of the present embodiment includes a worm gear 31, a worm wheel 32, gears (now shown), an output shaft 33, a recessed gear housing 34, and a cover plate 35. Here, the worm gear 31 is coupled with an end portion of the shaft 11c through a coupling and the like, and the worm wheel 32 is engaged (meshed) with the worm gear 31. The gears are coupled with the worm wheel 32 and the output shaft 33 is coupled with a final gear of the gears. The gear housing 34 receives the above components. The cover plate 35 closes an opening portion of the gear housing 34. The output shaft 33 projects in a direction D2 of the transverse axis of the cross sectional shape of the yoke housing 15 (in a transverse direction D2, in which the flat portions 17a, 17b are arranged to face with each other).

In the motor 1 of the present embodiment, the connector portion 22 is provided on one side of the longitudinal axis C of the armature 11 toward one 16a of the arcuate portions, and the worm wheel 32 of the transmission mechanism 30 is also provided on the same side of the longitudinal axis C of the armature 11. In other words, the worm wheel 32 is provided to have a rotation shaft 32a to face in the same direction with the output shaft 33 (the transverse direction D2, that is, a direction perpendicular to papers of FIGS. 1, 3) such that the rotation shaft 32a is provided on one side of the longitudinal axis C of the armature 11 toward the arcuate portion 16a. Then, the worm wheel 32 is provided within a space of an approximate total width of the yoke housing 15 and the connector portion 22 in the longitudinal direction D1. Therefore, in the motor 1 of the present embodiment, the transmission mechanism 30 can be provided in a space of a width W, which approximately corresponds to the total width of the yoke housing 15 and the connector portion 22 in the longitudinal direction D1.

Also, the worm wheel 32 has a diameter larger than the worm gear 31 and the like, and is a thin circular plate. The rotation shaft 32a of the worm wheel 32 is provided in the transverse direction D2 (direction of the transverse axis). Due to this, the transmission mechanism 30 is also shaped to be thinner in the transverse direction D2 similar to the yoke housing 15, except for a periphery of the output shaft 33.

Each permanent magnet 13 of the present embodiment is the magnetic material 13a that has been magnetized, as described above. In the motor 1 of the present embodiment, the bearing 18 and the magnetic materials 13a are provided inside the yoke housing 15, and then, the armature 11, the brush holder unit 20, and the gear housing 34 are assembled. After this, a magnetization apparatus 40 magnetizes the magnetic materials 13a from an outer peripheral portion of the yoke housing 15 to form the permanent magnets 13. Alternative magnetization will be described. The worm wheel 32 and the like may be further provided inside the gear housing 34 after the assembly of the gear housing 34 with the yoke housing 15. Then, the opening portion of the gear housing 34 may be closed by using the cover plate 35. In a state as above, where approximately all of components of the motor 1 are assembled, the magnetic materials 13a may be magnetized.

Figure 4:
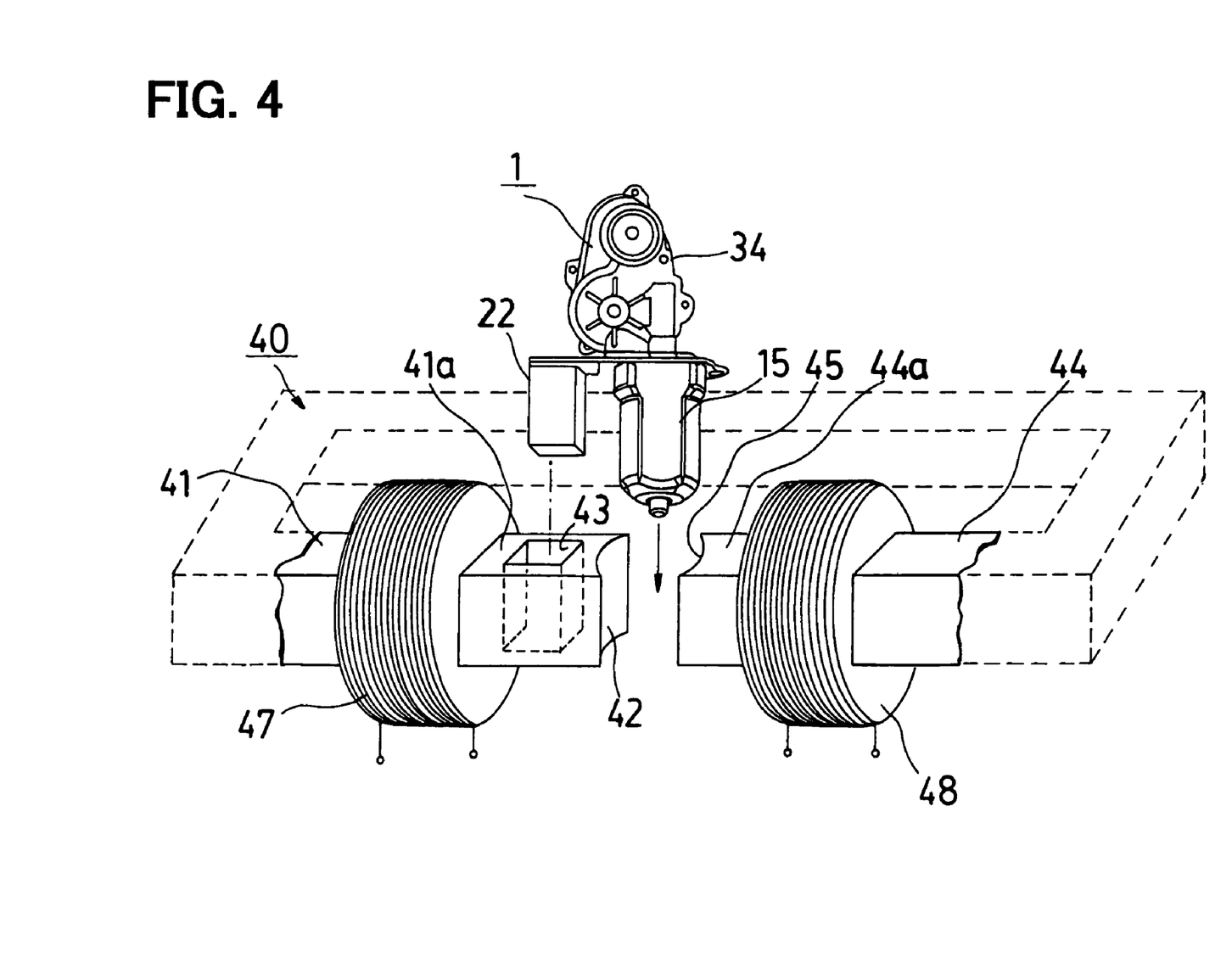
FIG. 4 is an explanation view of a magnetization apparatus according to the one embodiment of the present invention.

As shown in FIG. 4, the magnetization apparatus 40 of the present embodiment includes a pair of magnetization cores 41, 44 and magnetization coils 47, 48, which are wound around the magnetization cores 41, 44. The magnetization apparatus 40 is supplied with power from a power source device connected with end portions of the magnetization coils 47, 48 such that a magnetic field is generated from one of the magnetization cores to another (in the present embodiment, in a direction from the magnetization core 41 to the magnetization core 44). The magnetic field firstly travels through the magnetization core 41, then travels through a clearance between the magnetization cores 41, 44, and then through the magnetization core 44.

Each of the magnetization cores 41, 44 is a member having a cross section of an approximately rectangular shape, and opposing end surfaces are referred as magnetization surfaces 42, 45. The magnetization surfaces 42, 45 have arcuate recessed surfaces 42a, 45a, respectively, each shape of which corresponds to a curved shape of the corresponding one of the arcuate portions 16a, 16b of the yoke housing 15 (see FIG. 6). In other words, contour shapes of the arcuate recessed surfaces 42a, 45a approximately correspond to the corresponding outer shapes of the arcuate portions 16a, 16b of the yoke housing 15.

Therefore, in the present embodiment, when the yoke housing 15 is set (placed) between the magnetization cores 41, 44, the arcuate recessed surfaces 42a, 45a oppose the arcuate portions 16a, 16b of the yoke housing 15 via corresponding approximately constant slight clearances therebetween. By placing the magnetization surfaces 42, 45 to oppose the corresponding outer peripheral surfaces of the yoke housing 15 via the slight clearance, magnetic resistance can be reduced.

In the present embodiment, the magnetization surfaces 42, 45 include the arcuate recessed surfaces 42a, 45a, respectively, such that each end of upper surfaces 41a, 44a has both width end portions in a width direction projecting toward the opposing one (corresponding one) of the magnetization cores 44, 41. Therefore, the yoke housing 15 can be inserted into a space between the magnetization cores 41, 44 from the upper surface 41a side (the upper surface 44a side).

Figure 5:
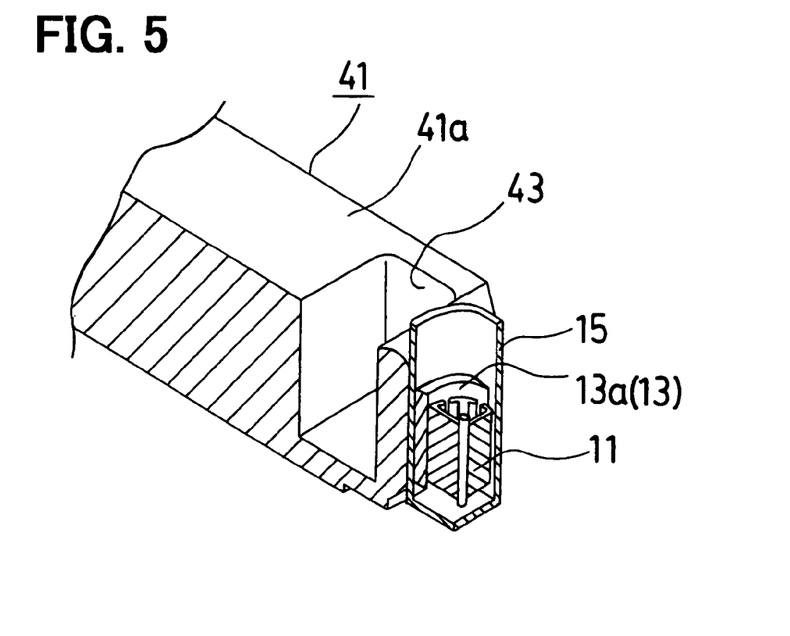
FIG. 5 is a cross sectional explanation view of a magnetization core of the magnetization apparatus according to the one embodiment of the present invention.

Also, in the present embodiment, as shown in FIGS. 4 and 5, the upper surface 41a of the magnetization core 41 has a receiving recess 43, which is recessed at the upper surface 41a. The receiving recess 43 is formed at a position by about the clearance L1 away from the magnetization surface 42 toward the magnetization coil 47.

The receiving recess 43 receives the connector portion 22 of the motor 1 when the yoke housing 15 is inserted between the magnetization cores 41, 44 to be placed. Therefore, the receiving recess 43 is formed at the upper surface 41a, which is a surface of peripheral surfaces of the magnetization core 41 facing in a direction for inserting the yoke housing 15.

The receiving recess 43 can be any shape, which can at least receive the connector portion 22 when the yoke housing 15 is inserted between the magnetization cores 41, 44. In the present embodiment, the receiving recess 43 is shaped to have a cross section of a rectangular.

In the magnetization apparatus of the present embodiment, the motor 1 has the connector portion 22 provided radially outward of the yoke housing 15 of the motor 1. For this motor 1, after the magnetic materials 13a, which are to be magnetized to become the permanent magnets 13, are provided inside the yoke housing 15, and the armature 11 is assembled, the magnetic materials 13a can be magnetized from the outer peripheral portion of the yoke housing 15. In other words, in the magnetization apparatus of the present embodiment, the magnetization cores 41, 44 defines the receiving recess 43 therein such that the receiving recess 43 receives the connector portion 22 when the motor 1 is placed to the magnetization apparatus. Therefore, the connector portion 22 is limited from contacting with the magnetization cores 41, 44, and thereby limiting from interfering the placing of the motor 1 to the magnetization apparatus. Thus, the yoke housing 15 can be placed to the magnetization apparatus such that the magnetic materials 13a inside the yoke housing 15 oppose the magnetization cores 41, 44 from the outer peripheral portion of the yoke housing 15.

Next, a magnetization method for magnetizing the magnetic materials 13a of the motor 1 of the present embodiment will be described.

Firstly, in the present embodiment, the magnetic materials 13a, the bearing 18, and the like are fixed to be provided inside the yoke housing 15 (a step for providing the magnetic material). Next, the armature 11 is inserted into the yoke housing 15 such that the armature 11 is provided inside the yoke housing 15 in a state, where one end of the shaft 11c is supported by the bearing 18 (a step for providing the armature).

Then, the brush holder unit 20 is assembled to close the opening side of the yoke housing 15 (a step for assembling the brush holder unit). At this time, in the present embodiment, the transmission mechanism 30, such as the gear housing 34, is further assembled to form the motor 1.

In the above way, the motor 1, which is assembled with the brush holder unit 20, the gear housing 34, and the like, is set (placed) to the magnetization apparatus 40 (a step for placing the motor). In the step for placing the motor (when the motor is placed), as described above, the yoke housing 15 is inserted between the pair of magnetization cores 41, 44, which face with each other, from the end portion of the yoke housing 15. At this time, the connector portion 22 is inserted into the receiving recess 43, which is provided at the magnetization core 41. Due to this, the yoke housing 15 can be inserted to a predetermined position, where the magnetic materials 13a provided at the inner peripheral surface of the yoke housing 15 is provided between the magnetization surfaces 42, 45. When the yoke housing 15 is inserted to the predetermined position, the magnetic materials 13a inside the yoke housing 15 faces with the arcuate recessed surfaces 42a, 45a.

Figure 6:
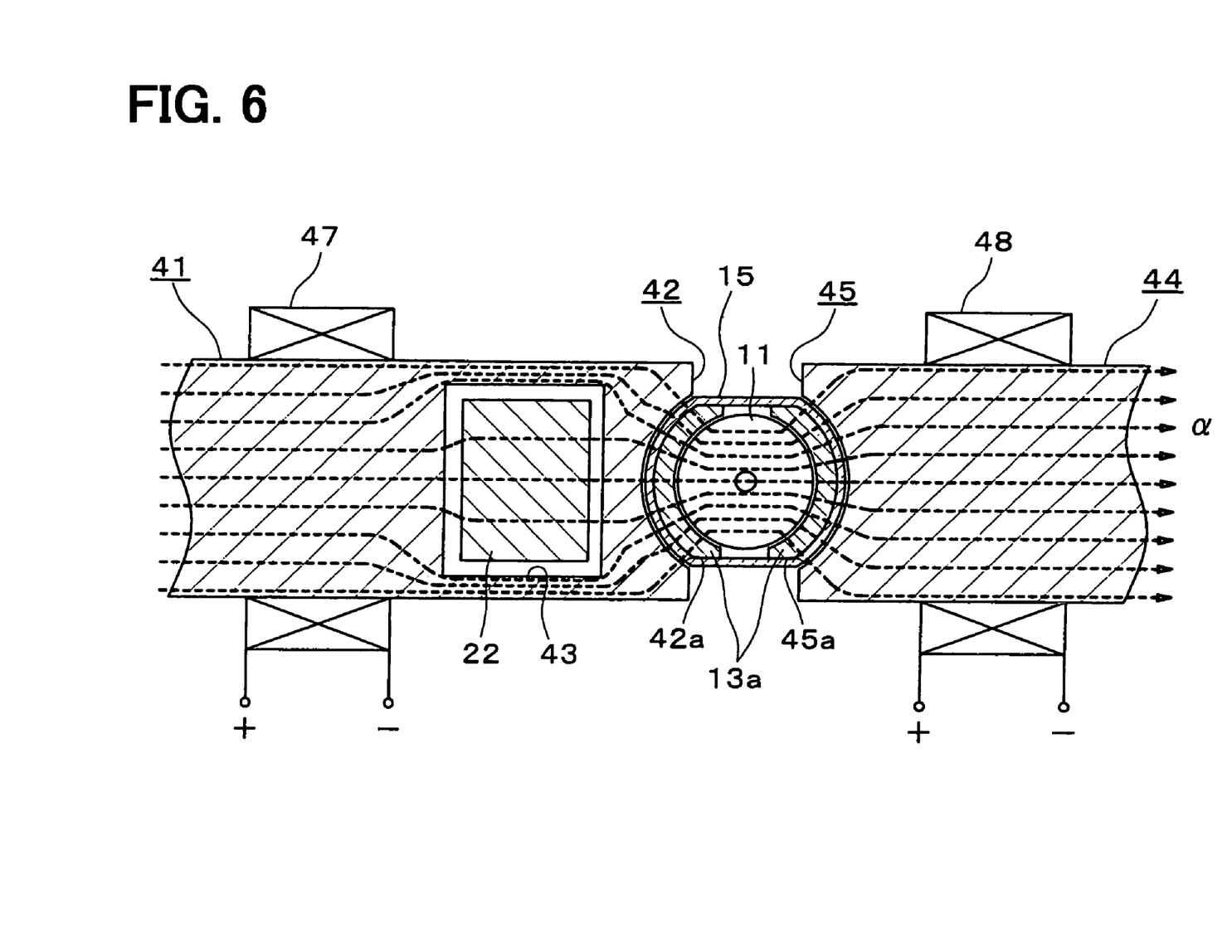
FIG. 6 is an explanation view of a magnetization process according to the one embodiment of the present invention.

Then, as shown in FIG. 6, in a condition, where the connector portion 22 is received in the receiving recess 43, the magnetization coils 47, 48 are supplied with power such that the magnetic field α is generated at the magnetization cores 41, 44 to magnetize the magnetic materials 13a (a step for magnetization, magnetization process). Due to this, the motor 1 is manufactured.

The receiving recess 43 may be recessed in the longitudinal direction of the armature 11, which is provided inside the yoke housing 15 provided between the magnetization surfaces 42, 45. In this structure, when the motor 1 is placed to the magnetization apparatus, the yoke housing 15 only requires to be displaced in the longitudinal direction of the armature 11 to provide the yoke housing 15 between the magnetization surfaces 42, 45, and also to insert the connector portion 22 into the receiving recess 43. The above provision of the yoke housing 15 between the magnetization surfaces 42, 45, and the insertion of the connector portion 22 into the receiving recess 43 may occur simultaneously in one embodiment.

In the present embodiment, in the process for placing the yoke housing 15 to the magnetization apparatus, even in a case, where the yoke housing 15 has the connector portion 22 extending radially outward of the brush holder, the connector portion 22 is received by the receiving recess 43, which is recessed at the magnetization cores 41, 44. Therefore, the connector portion 22 is limited from interfering the lacing of the yoke housing 15. Thus, the motor 1, which has the connector portion 22 provided radially outward of the yoke housing 15, can be magnetized from the outer peripheral portion of the yoke housing 15.

In the magnetization process, the magnetic field α passes mainly through other parts, as a magnetic passage, other than the receiving recess 43 inside the magnetization core 41. Then, the magnetic field α passes from the magnetization surface 42 of the magnetization core 41 through the yoke housing 15 to magnetize one magnetic material 13a inside. After this, the magnetic field α magnetizes another magnetic material 13a, which opposes the one magnetic material 13a, and the magnetic field α penetrates the magnetization core 44 from the magnetization surface 45 via the yoke housing 15.

Figure 7:
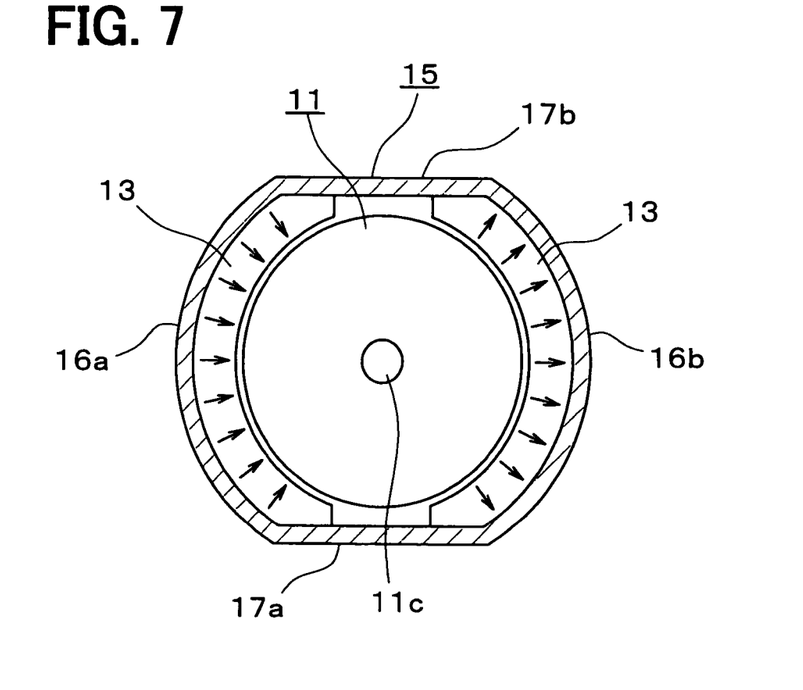
FIG. 7 is a cross sectional explanation view of the motor after the magnetization process according to the one embodiment of the present invention.

By magnetizing the magnetic materials 13a for a predetermined period as above, the magnetic materials 13a get magnetized by the magnetic field α to become the permanent magnets 13. As shown in FIG. 7, when magnetization is operated as above, the permanent magnets 13 is magnetized in a radial direction of the armature 11. In other words, in the present embodiment, a magnet flux of one of the permanent magnets 13 passes radially inwardly, and another magnet flux of another one of the permanent magnets 13 passes radially outwardly.

Figure 8:
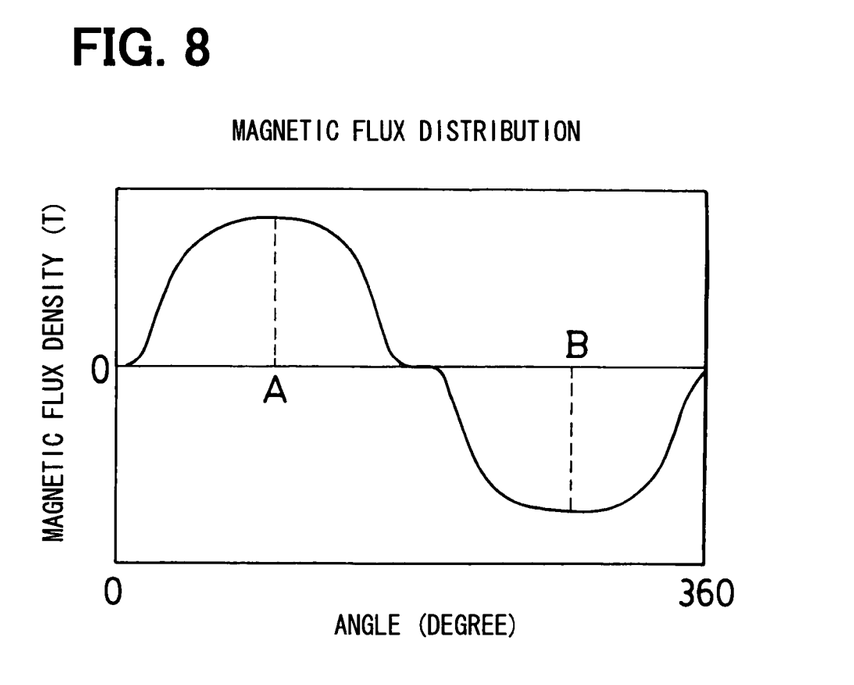
FIG. 8 is a chart showing a magnetic flux distribution of a permanent magnet according to the one embodiment of the present invention.

FIG. 8 shows a magnetic flux distribution in a circumferential direction of the permanent magnets 13 that has been the magnetized. In other words, FIG. 8 shows a relation between a rotation angle of the armature 11 in a rotation direction relative to a reference position and a magnitude of a magnet flux density at the rotation angle. A point A in FIG. 8 corresponds to a central portion of the arcuate portion 16a in the circumferential direction (a side face that opposes to the connector portion 22), a point B corresponds to a central portion of arcuate portion 16b in the circumferential direction. In the present embodiment, each magnet flux density indicates a maximum value at the point A and the point B, and the magnitude (absolute value) of the maximum value is approximately equal to each other.

In other words, in the present embodiment, the receiving recess 43 is formed at the magnetization core 41. The permanent magnet 13 that has been magnetized has a different magnet flux direction at the magnetization core 41 in the radial direction different from that at the magnetization core 44. There is not generated a significant difference of the magnetic flux distribution between the magnetization core 41 and the magnetization core 44. That is, the receiving recess 43 only makes a difference between the magnetic passage inside the magnetization core 41 and the magnetic passage inside the magnetization core 44. Thus, the magnetic field α is sufficiently generated between the magnetization surface 42 and the magnetization surface 45 sufficiently for applying a predetermined magnetic flux distribution as shown in FIG. 8 to the magnetic materials 13a.

In the above embodiment, only one of the pair of magnetization cores 41, 44 (i.e., the magnetization core 41) includes the receiving recess 43. However, the present invention is not limited to this. The receiving recess 43 may be alternatively formed at each of the magnetization cores 41, 44. If the receiving recess 43 is formed at each of them as above, the yoke housing 15 may be set (placed) in the magnetization apparatus 40 even when the connector portion 22 is located toward the arcuate portion 16b in stead of the case, where the connector portion 22 is located toward the arcuate portion 16a as described in the above embodiment, in a state, where the connector portion 22 is received in the receiving recess 43 provided to the magnetization core 44.

Also, if the receiving recess 43 is formed at each of the magnetization cores 41, 44 as above, the magnetization cores 41, 44 may be formed into a common shape. As a result, the magnetization cores 41, 44 can be designed in common.

Also, in the above embodiment, the receiving recess 43 is a recess with a bottom having a predetermined depth from the upper surface 41a of the magnetization core 41. However, the present invention is not limited to this. The receiving recess 43 may be alternatively a thorough hole that penetrates through the magnetization core 41, and also the receiving recess 43 may be a groove of the magnetization core 41, which groove is cut in a width direction (up-and-down direction in FIG. 6), as long as the receiving recess 43 is recessed at the upper surface 41a such that the upper surface 41a can simultaneously receive the connector portion 22 while the yoke housing 15 is inserted between the magnetization cores 41, 44.

Also, in the above embodiment, the multiple arcuate magnetic materials 13a are arranged at the inner peripheral surface of the yoke housing 15, and then each of the magnetic materials 13a is magnetized to form the permanent magnets 13. However, the present invention is not limited to this. A hollow cylindrical magnetic material may be alternatively arranged at the inner peripheral surface of the yoke housing 15, and then the magnetic material may be magnetized with alternate magnet flux directions (one direction of a magnetic flux is opposite from those of adjacent magnetic fluxes) at a predetermined angle.

Also, in the above embodiment, the magnetization apparatus 40 includes the pair of magnetization cores 41, 44, which correspond to the positions of the permanent magnets 13 of the motor 1. However, the present invention is not limited to this. Alternatively, multiple pairs of magnetization cores may be included by the magnetization apparatus 40.

Additional advantages and modifications will readily occur to those skilled in the art. The invention in its broader terms is therefore not limited to the specific details, representative apparatus, and illustrative examples shown and described.

What is claimed is:

1. A magnetization apparatus for magnetizing a magnetic material provided inside a yoke housing of a motor to oppose to an armature, the motor having a connector portion radially outward of the yoke housing, the magnetization apparatus comprising:
    at least one pair of magnetization cores that are provided to oppose to each other, wherein the at least one pair of magnetization cores have corresponding magnetization surfaces, which oppose to each other; and
    a plurality of magnetization coils that generate a magnetic field at the at least one pair of magnetization cores, wherein the plurality of magnetization coils magnetize the magnetic material in a state, where the yoke housing is provided between the magnetization surfaces, wherein:
    the at least one pair of magnetization cores defines a receiving recess therein for receiving the connector portion of the motor in the state, where the yoke housing is provided between the magnetization surfaces.

2. The magnetization apparatus according to claim 1, wherein:
    the yoke housing has a peripheral surface, which has a cross section of a flat shape, and which includes a pair of arcuate portions and a pair of flat portions that are approximately parallel with each other for connecting the arcuate portions;
    each of the magnetization surfaces of the at least one pair of magnetization cores has an arcuate recessed surface, which is shaped to correspond to an outer peripheral shape of the corresponding one of the pair of arcuate portions; and
    the at least one pair of magnetization cores are configured for providing the yoke housing between the magnetization surfaces in a state, where each arcuate recessed surface is provided to oppose the corresponding one of the pair of arcuate portions of the yoke housing.

3. The magnetization apparatus according to claim 1, wherein:
    the one of the pair of magnetization cores defines the receiving recess therein.

4. The magnetization apparatus according to claim 1, wherein:
    the receiving recess is recessed in a longitudinal direction of the armature inside the yoke housing, which is provided between the magnetization surfaces.

5. A magnetization method for magnetizing a magnetic material provided inside a yoke housing of a motor that has a connector portion provided radially outward of the yoke housing, the method comprising:
    providing the magnetic material to be fixed inside the yoke housing;
    providing an armature rotatably inside the yoke housing to oppose the magnetic material;
    assembling a brush holder unit, which has the connector portion, with an opening side of the yoke housing;
    placing the motor by providing the yoke housing between at least one pair of magnetization cores, which oppose with each other, and by inserting the connector portion into a receiving recess, which is recessed in the at least one pair of magnetization cores; and
    generating a magnetic field at the at least one pair of magnetization cores to magnetize the magnetic material inside the yoke housing.

6. The magnetization method according to claim 5, wherein:
    the receiving recess is recessed in a longitudinal direction of the armature inside the yoke housing, which is provided between the at least one pair of magnetization cores; and
    the placing of the motor includes inserting the connector portion into the receiving recess by displacing the yoke housing in the longitudinal direction of the armature.

7. The magnetization method according to claim 5, wherein:
    the providing of the yoke housing between the at least one pair of magnetization cores includes providing the yoke housing between the at least one pair of magnetization cores simultaneously with the inserting of the connector portion into the receiving recess to place the motor.

* * * * *